(12) United States Patent
Lethellier (10) Patent No.: US 11,462,943 B2
(45) Date of Patent: Oct. 4, 2022

(54) DC LINK CHARGING OF CAPACITOR IN A WIRELESS POWER TRANSFER PAD

(71) Applicant: Wireless Advanced Vehicle Electrification, Inc., Salt Lake City, UT (US)

(72) Inventor: Patrice Lethellier, Herriman, UT (US)

(73) Assignee: Wireless Advanced Vehicle Electrification, LLC, Salt Lake City, UT (US)

(*) Notice: Subject to any disclaimer, the term of this patent is extended or adjusted under 35 U.S.C. 154(b) by 0 days.

(21) Appl. No.: 16/262,717

(22) Filed: Jan. 30, 2019

(65) Prior Publication Data

US 2019/0238001 A1 Aug. 1, 2019

Related U.S. Application Data

(60) Provisional application No. 62/623,777, filed on Jan. 30, 2018.

(51) Int. Cl.
*H02J 7/00* (2006.01)
*H02J 50/12* (2016.01)
*H02J 7/02* (2016.01)
*H01F 38/14* (2006.01)
*B60L 53/55* (2019.01)
(Continued)

(52) U.S. Cl.
CPC .............. *H02J 50/12* (2016.02); *B60L 53/12* (2019.02); *B60L 53/55* (2019.02); *H01F 38/14* (2013.01); *H02J 7/025* (2013.01); *H02M 3/08* (2013.01); *H02J 7/345* (2013.01); *H02M 7/10* (2013.01); *H02M 2007/4815* (2013.01)

(58) Field of Classification Search
USPC ......................................................... 320/108
See application file for complete search history.

(56) References Cited

U.S. PATENT DOCUMENTS 3,938,018 A 2/1976 Dahl
3,942,535 A 3/1976 Schulman
(Continued)

FOREIGN PATENT DOCUMENTS

CA 2908352 10/2014
CN 1825505 A 8/2006
(Continued)

OTHER PUBLICATIONS

Alekseev O.V. et al. EJST-Tech Devices. Moscow, Energoizdat, 1981, p. 22, fig.2.5 (a).
(Continued)

*Primary Examiner* — Samuel Berhanu
(74) *Attorney, Agent, or Firm* — Han Santos, PLLC (57) ABSTRACT

An apparatus for wireless power transfer is disclosed. An alternate apparatus and a system perform the functions of the apparatus. The apparatus includes a wireless power transfer ("WPT") pad, a secondary circuit with a rectification section that receives power from the WPT pad, a capacitor, and a first rectification device connected to the capacitor. The capacitor and first rectification device are connected in parallel with the rectification section and in parallel with a load. The apparatus includes a second rectification device connected to the rectification section and an intermediate node between the capacitor and first rectification device.

20 Claims, 5 Drawing Sheets

(51) Int. Cl.
   *B60L 53/12*   (2019.01)
   *H02M 3/08*    (2006.01)
   *H02J 7/34*        (2006.01)
   *H02M 7/10*        (2006.01)
   *H02M 7/48*        (2007.01)

(56) References Cited

U.S. PATENT DOCUMENTS

| | | | |
|---|---|---|---|
| 4,527,123 A | 7/1985 | Gilman et al. | |
| 4,647,910 A | 3/1987 | Torre | |
| 4,800,328 A | 1/1989 | Bolger et al. | |
| 4,836,344 A | 6/1989 | Bolger | |
| 5,207,304 A | 5/1993 | Lechner et al. | |
| 5,293,308 A | 3/1994 | Boys et al. | |
| 5,469,036 A | 11/1995 | Eto | |
| 5,528,113 A | 6/1996 | Boys et al. | |
| 5,617,003 A | 4/1997 | Odachi et al. | |
| 5,654,621 A | 8/1997 | Seelig | |
| 5,669,470 A | 9/1997 | Ross | |
| 5,701,121 A | 12/1997 | Murdoch | |
| 5,703,461 A | 12/1997 | Minoshima et al. | |
| 5,710,502 A | 1/1998 | Poumey | |
| 5,734,355 A | 3/1998 | Watanabe | |
| 5,808,373 A | 9/1998 | Hamanishi et al. | |
| 5,821,638 A | 10/1998 | Boys et al. | |
| 5,831,841 A | 11/1998 | Nishino | |
| 5,842,986 A | 12/1998 | Avrin et al. | |
| 5,850,135 A | 12/1998 | Kuki et al. | |
| 5,909,100 A | 6/1999 | Watanabe et al. | |
| 5,945,888 A | 8/1999 | Weinert et al. | |
| 5,978,242 A | 11/1999 | Raad et al. | |
| 5,991,170 A | 11/1999 | Nagai et al. | |
| 6,011,320 A | 1/2000 | Miyamoto et al. | |
| 6,040,986 A * | 3/2000 | Sakamoto | H01F 38/14 363/21.02 |
| 6,075,433 A | 6/2000 | Ono et al. | |
| 6,188,179 B1 | 2/2001 | Boys et al. | |
| 6,305,467 B1 | 10/2001 | Connell et al. | |
| 6,317,338 B1 | 11/2001 | Boys | |
| 6,350,951 B1 | 2/2002 | Askew | |
| 6,421,600 B1 | 7/2002 | Ross | |
| 6,459,218 B2 | 10/2002 | Boys et al. | |
| 6,483,202 B1 | 11/2002 | Boys | |
| 6,501,364 B1 | 12/2002 | Hui et al. | |
| 6,541,966 B1 | 4/2003 | Keene | |
| 6,630,805 B2 | 10/2003 | Makaran | |
| 6,960,968 B2 | 11/2005 | Odendaal et al. | |
| 7,019,620 B2 | 3/2006 | Bohler et al. | |
| 7,116,540 B2 | 10/2006 | Green et al. | |
| 7,157,913 B2 | 1/2007 | Nelson | |
| 7,164,255 B2 | 1/2007 | Hui | |
| 7,243,752 B2 | 7/2007 | Green et al. | |
| 7,375,492 B2 | 5/2008 | Calhoon et al. | |
| 7,375,493 B2 | 5/2008 | Calhoon et al. | |
| 7,378,817 B2 | 5/2008 | Calhoon et al. | |
| 7,451,839 B2 | 11/2008 | Perlman | |
| 7,521,890 B2 | 4/2009 | Lee et al. | |
| 7,576,514 B2 | 8/2009 | Hui | |
| 7,605,496 B2 | 10/2009 | Stevens et al. | |
| 7,620,438 B2 | 11/2009 | He | |
| 7,741,734 B2 | 6/2010 | Joannopoulos et al. | |
| 7,791,312 B2 | 9/2010 | Kook | |
| 7,804,272 B2 | 9/2010 | Morita et al. | |
| 7,825,537 B2 | 11/2010 | Freer | |
| 7,825,543 B2 | 11/2010 | Karalis et al. | |
| 7,893,564 B2 | 2/2011 | Bennett | |
| 7,909,483 B2 | 3/2011 | Jacobs et al. | |
| 7,952,322 B2 | 5/2011 | Partovi et al. | |
| 3,008,888 A1 | 8/2011 | Oyobe et al. | |
| 3,040,103 A1 | 10/2011 | Hui et al. | |
| 3,050,068 A1 | 11/2011 | Hussmann et al. | |
| 3,069,100 A1 | 11/2011 | Taylor et al. | |
| 8,085,556 B2 | 12/2011 | Moussaoui | |
| 8,093,758 B2 | 1/2012 | Hussmann et al. | |
| 8,111,042 B2 | 2/2012 | Bennett | |
| 8,125,208 B2 | 2/2012 | Gyland | |
| 8,169,185 B2 | 5/2012 | Partovi et al. | |
| 8,183,938 B2 | 5/2012 | Boys et al. | |
| 8,217,621 B2 | 7/2012 | Tsai et al. | |
| 8,232,764 B2 | 7/2012 | Inoue et al. | |
| 8,269,595 B2 | 9/2012 | Okada et al. | |
| 8,271,089 B2 | 9/2012 | Dinsmoor et al. | |
| 8,278,784 B2 | 10/2012 | Cook et al. | |
| 8,290,531 B2 | 10/2012 | Wakamatsu | |
| 8,304,935 B2 | 11/2012 | Karalis et al. | |
| 8,332,547 B2 | 12/2012 | Sugaya | |
| 8,339,096 B2 | 12/2012 | Osada | |
| 8,362,651 B2 | 1/2013 | Hamam et al. | |
| 8,378,523 B2 | 2/2013 | Cook et al. | |
| 8,390,249 B2 | 3/2013 | Walley et al. | |
| 8,405,486 B2 | 3/2013 | Yamada et al. | |
| 8,432,070 B2 | 4/2013 | Cook et al. | |
| 8,446,045 B2 | 5/2013 | Smith et al. | |
| 8,446,046 B2 | 5/2013 | Fells et al. | |
| 8,466,654 B2 | 6/2013 | Cook et al. | |
| 8,469,122 B2 | 6/2013 | Perlman et al. | |
| 8,471,410 B2 | 6/2013 | Karalis et al. | |
| 8,482,157 B2 | 7/2013 | Cook et al. | |
| 8,498,763 B2 | 7/2013 | Hafner et al. | |
| 8,531,153 B2 | 9/2013 | Baarman et al. | |
| 8,531,162 B2 | 9/2013 | Hafner et al. | |
| 8,536,739 B2 | 9/2013 | Ichikawa et al. | |
| 8,547,057 B2 | 10/2013 | Dunworth et al. | |
| 8,581,437 B2 | 11/2013 | Delforge | |
| 8,587,154 B2 | 11/2013 | Fells et al. | |
| 8,639,191 B2 | 1/2014 | Boys | |
| 8,643,219 B2 | 2/2014 | Yabe et al. | |
| 8,674,551 B2 | 3/2014 | Low et al. | |
| 8,710,701 B2 | 4/2014 | Cook et al. | |
| 8,723,366 B2 | 5/2014 | Fiorello et al. | |
| 8,749,334 B2 | 6/2014 | Boys et al. | |
| 8,766,482 B2 | 7/2014 | Cook et al. | |
| 8,810,071 B2 | 8/2014 | Sauerlaender et al. | |
| 8,833,533 B2 | 9/2014 | Suh et al. | |
| 8,854,011 B2 | 10/2014 | Ichikawa et al. | |
| 8,855,554 B2 | 10/2014 | Cook et al. | |
| 8,855,786 B2 | 10/2014 | Derbas et al. | |
| 8,878,393 B2 | 11/2014 | Kirby et al. | |
| 8,884,468 B2 | 11/2014 | Lemmens et al. | |
| 8,884,581 B2 | 11/2014 | Widmer et al. | |
| 8,901,857 B2 | 12/2014 | Lanchava et al. | |
| 8,907,617 B2 | 12/2014 | Ichikawa et al. | |
| 8,912,687 B2 | 12/2014 | Kesler et al. | |
| 8,914,080 B2 | 12/2014 | Kowalewski | |
| 8,937,409 B2 | 1/2015 | Ichikawa et al. | |
| 9,065,284 B2 | 6/2015 | Malpas et al. | |
| 9,105,959 B2 | 8/2015 | Kesler et al. | |
| 9,178,376 B2 | 11/2015 | Jung et al. | |
| 9,184,595 B2 | 11/2015 | Kurs et al. | |
| 9,190,875 B2 | 11/2015 | Mohammadian | |
| 9,306,635 B2 | 4/2016 | Kurs et al. | |
| 9,306,636 B2 | 4/2016 | Kwon et al. | |
| 9,312,924 B2 | 4/2016 | Ozaki et al. | |
| 9,442,172 B2 | 9/2016 | Verghese et al. | |
| 9,444,265 B2 | 9/2016 | Karalis et al. | |
| 9,450,456 B2 | 9/2016 | Cook et al. | |
| 9,461,505 B2 | 10/2016 | Teo et al. | |
| 9,530,556 B2 | 12/2016 | Davila et al. | |
| 9,561,730 B2 | 2/2017 | Widmer et al. | |
| 9,634,730 B2 | 4/2017 | Cook et al. | |
| 9,682,632 B2 | 6/2017 | Brill et al. | |
| 9,751,416 B2 | 9/2017 | Hafner et al. | |
| 9,767,955 B2 | 9/2017 | Boys et al. | |
| 9,774,086 B2 | 9/2017 | Cook et al. | |
| 9,837,204 B2 | 12/2017 | Widmer et al. | |
| 9,905,351 B2 | 2/2018 | Tatsuta et al. | |
| 9,954,387 B2 | 4/2018 | Sultenfuss et al. | |
| 9,973,038 B2 | 5/2018 | Li et al. | |
| 10,205,384 B2 | 2/2019 | Lethellier et al. | |
| 10,369,894 B2 | 8/2019 | McCool et al. | |
| 10,493,855 B2 | 12/2019 | Chase et al. | |
| 10,978,245 B2 | 4/2021 | Lethellier | |
| 10,988,042 B1 | 4/2021 | Chase | |
| 2001/0012208 A1 | 8/2001 | Boys | |

(56) References Cited

U.S. PATENT DOCUMENTS

| | | |
|---|---|---|
| 2002/0093313 A1* | 7/2002 | Hoffmann ............ F02D 41/2096 320/166 |
| 2002/0177884 A1 | 11/2002 | Ahn et al. |
| 2003/0210106 A1 | 11/2003 | Cheng et al. |
| 2004/0119576 A1 | 6/2004 | Nakao et al. |
| 2004/0203986 A1 | 10/2004 | Gagnon |
| 2005/0083019 A1 | 4/2005 | Green |
| 2005/0161300 A1 | 7/2005 | Green |
| 2005/0189910 A1 | 9/2005 | Hui |
| 2006/0006873 A1 | 1/2006 | Nelson |
| 2007/0064406 A1 | 3/2007 | Beart |
| 2007/0072474 A1 | 3/2007 | Beasley et al. |
| 2007/0131505 A1 | 6/2007 | Kim |
| 2007/0188284 A1 | 8/2007 | Dobbs |
| 2008/0061733 A1 | 3/2008 | Toya |
| 2008/0079392 A1* | 4/2008 | Baarman ................ H02J 7/025 320/108 |
| 2009/0010028 A1 | 1/2009 | Baarman et al. |
| 2009/0058189 A1 | 3/2009 | Cook et al. |
| 2009/0067207 A1 | 3/2009 | Nishino |
| 2009/0160262 A1 | 6/2009 | Schmidt et al. |
| 2009/0313032 A1 | 12/2009 | Hafner et al. |
| 2009/0313034 A1 | 12/2009 | Ferro et al. |
| 2009/0313174 A1 | 12/2009 | Hafner et al. |
| 2010/0017249 A1 | 1/2010 | Fincham et al. |
| 2010/0080028 A1 | 4/2010 | Cheng et al. |
| 2010/0110741 A1 | 5/2010 | Lin et al. |
| 2010/0225271 A1 | 9/2010 | Oyobe et al. |
| 2010/0259109 A1 | 10/2010 | Sato |
| 2010/0276995 A1 | 11/2010 | Marzetta et al. |
| 2010/0277121 A1 | 11/2010 | Hall et al. |
| 2010/0315080 A1 | 12/2010 | Duncan et al. |
| 2010/0328044 A1 | 12/2010 | Wallenschmidt et al. |
| 2011/0031967 A1 | 2/2011 | Tanaka et al. |
| 2011/0074346 A1 | 3/2011 | Hall et al. |
| 2011/0127845 A1 | 6/2011 | Walley et al. |
| 2011/0127951 A1* | 6/2011 | Walley .................... H02J 50/80 320/108 |
| 2011/0184842 A1 | 7/2011 | Melen |
| 2011/0254503 A1 | 10/2011 | Widmer et al. |
| 2011/0285349 A1 | 11/2011 | Widmer et al. |
| 2011/0304217 A1 | 12/2011 | Yamamoto et al. |
| 2012/0043172 A1 | 2/2012 | Ichikawa |
| 2012/0068655 A1 | 3/2012 | Inuduka et al. |
| 2012/0089202 A1 | 4/2012 | Staller |
| 2012/0098330 A1 | 4/2012 | Ichikawa et al. |
| 2012/0146580 A1 | 6/2012 | Kitamura et al. |
| 2012/0161696 A1 | 6/2012 | Cook et al. |
| 2012/0181875 A1 | 7/2012 | Wechlin et al. |
| 2012/0187757 A1 | 7/2012 | Wechlin et al. |
| 2012/0217818 A1 | 8/2012 | Yerazunis et al. |
| 2012/0235504 A1 | 9/2012 | Kesler et al. |
| 2012/0235566 A1 | 9/2012 | Karalis et al. |
| 2012/0235636 A1 | 9/2012 | Partovi |
| 2012/0249059 A1* | 10/2012 | Matsumae ............ H02M 3/337 320/107 |
| 2012/0306439 A1 | 12/2012 | Ichikawa et al. |
| 2013/0002034 A1 | 1/2013 | Onizuka et al. |
| 2013/0033351 A1 | 2/2013 | Kim et al. |
| 2013/0038272 A1 | 2/2013 | Sagata |
| 2013/0039099 A1 | 2/2013 | Wu et al. |
| 2013/0062959 A1 | 3/2013 | Lee et al. |
| 2013/0088090 A1 | 4/2013 | Wu et al. |
| 2013/0119773 A1 | 5/2013 | Davis |
| 2013/0127253 A1 | 5/2013 | Stark et al. |
| 2013/0181667 A1 | 7/2013 | Takeshita et al. |
| 2013/0181668 A1 | 7/2013 | Tabata et al. |
| 2013/0188397 A1 | 7/2013 | Wu et al. |
| 2013/0207468 A1 | 8/2013 | Wu et al. |
| 2013/0207601 A1* | 8/2013 | Wu .......................... H02J 50/12 320/108 |
| 2013/0214735 A1 | 8/2013 | Kang et al. |
| 2013/0236337 A1 | 9/2013 | Gummin et al. |
| 2013/0249299 A1 | 9/2013 | Shijo et al. |
| 2013/0272044 A1 | 10/2013 | Boys et al. |
| 2013/0293192 A1* | 11/2013 | Abe ...................... H02M 7/217 320/108 |
| 2013/0307468 A1 | 11/2013 | Lee et al. |
| 2014/0015328 A1 | 1/2014 | Beaver et al. |
| 2014/0077614 A1* | 3/2014 | Park ........................ H02J 50/80 307/104 |
| 2014/0125140 A1 | 5/2014 | Widmer et al. |
| 2014/0153289 A1 | 6/2014 | Kao et al. |
| 2014/0183967 A1 | 7/2014 | Ryu et al. |
| 2014/0203662 A1 | 7/2014 | Bae |
| 2014/0225439 A1 | 8/2014 | Mao |
| 2014/0239729 A1 | 8/2014 | Covic |
| 2014/0254208 A1 | 9/2014 | Dai et al. |
| 2015/0028478 A1 | 1/2015 | Meyer et al. |
| 2015/0042168 A1 | 2/2015 | Widmer |
| 2015/0077053 A1 | 3/2015 | Stamenic et al. |
| 2015/0091517 A1 | 4/2015 | Blum et al. |
| 2015/0145634 A1 | 5/2015 | Kurz et al. |
| 2015/0155095 A1 | 6/2015 | Wu et al. |
| 2015/0170833 A1 | 6/2015 | Widmer et al. |
| 2015/0236546 A1 | 8/2015 | Kesler et al. |
| 2015/0246614 A1 | 9/2015 | Dames et al. |
| 2015/0263532 A1 | 9/2015 | Van Wageningen |
| 2015/0263640 A1 | 9/2015 | Russell et al. |
| 2015/0302985 A1 | 10/2015 | Kurs |
| 2015/0310722 A1 | 10/2015 | Sousa et al. |
| 2015/0364929 A1 | 12/2015 | Davis |
| 2016/0141097 A1 | 5/2016 | Oo et al. |
| 2016/0233728 A1 | 8/2016 | Park et al. |
| 2016/0241086 A1 | 8/2016 | Jung et al. |
| 2016/0285317 A1 | 9/2016 | Maniktala |
| 2016/0294189 A1 | 10/2016 | Uno et al. |
| 2016/0336816 A1 | 11/2016 | Mach et al. |
| 2016/0380469 A1 | 12/2016 | Lethellier et al. |
| 2017/0018970 A1 | 1/2017 | Zhang et al. |
| 2017/0040845 A1 | 2/2017 | Yuasa et al. |
| 2017/0057370 A1 | 3/2017 | Harper |
| 2017/0063170 A1 | 3/2017 | Harper |
| 2017/0149294 A1 | 5/2017 | Wight et al. |
| 2017/0264130 A1 | 9/2017 | Lethellier |
| 2017/0271924 A1 | 9/2017 | Mao et al. |
| 2017/0279307 A1 | 9/2017 | Cho et al. |
| 2017/0324281 A1 | 11/2017 | Che |
| 2018/0040416 A1 | 2/2018 | Lestoquoy |
| 2018/0048184 A1 | 2/2018 | Stout, II et al. |
| 2018/0062421 A1 | 3/2018 | Danilovic et al. |
| 2018/0351415 A1 | 12/2018 | Masquelier et al. |
| 2018/0361863 A1 | 12/2018 | Islinger et al. |
| 2018/0367030 A1 | 12/2018 | Lethellier et al. |
| 2019/0002380 A1 | 1/2019 | Lethellier |
| 2019/0051452 A1 | 2/2019 | Lethellier |
| 2019/0103767 A1 | 4/2019 | Lethellier |
| 2019/0131823 A1 | 5/2019 | Ahn et al. |
| 2019/0198239 A1 | 6/2019 | Xu et al. |
| 2019/0252921 A1 | 8/2019 | Lethellier et al. |

FOREIGN PATENT DOCUMENTS

| | | |
|---|---|---|
| CN | 1901345 | 1/2007 |
| CN | 101346870 | 1/2009 |
| CN | 102280945 A | 12/2011 |
| CN | 102299631 | 12/2011 |
| CN | 102870338 | 1/2013 |
| CN | 103262387 B | 8/2016 |
| CN | 103918170 B | 3/2017 |
| CN | 104416266 | 4/2017 |
| CN | 106740220 | 5/2017 |
| CN | 110999063 A | 2/2020 |
| CN | 111183564 | 4/2020 |
| DE | 102004023197 A1 | 8/2006 |
| DE | 102014218067 | 3/2016 |
| DE | 102014218067 A1 | 3/2016 |
| EP | 0409880 B1 | 1/1991 |
| EP | 0666804 B1 | 8/1995 |
| EP | 2091129 A2 | 8/2009 |
| EP | 2130287 A1 | 12/2009 |
| EP | 2390984 | 11/2011 |
| EP | 2752957 A1 | 7/2014 |

(56) References Cited

FOREIGN PATENT DOCUMENTS

| | | |
|---|---|---|
| EP | 2833509 | 2/2015 |
| EP | 2985870 | 2/2016 |
| EP | 2819272 | 12/2017 |
| EP | 3669437 A1 | 3/2020 |
| EP | 3639359 A1 | 4/2020 |
| GB | 2389720 A | 9/2005 |
| JP | H10261898 A | 9/1998 |
| JP | H11186086 A | 7/1999 |
| JP | 2001044054 A | 2/2001 |
| JP | 2002078103 A | 3/2002 |
| JP | 2003284343 | 3/2002 |
| JP | 2002137659 A | 5/2002 |
| JP | 2002246248 A | 8/2002 |
| JP | 2002299138 A | 10/2002 |
| JP | 3432317 B2 | 8/2003 |
| JP | 2005073313 A | 3/2005 |
| JP | 2006042519 A | 2/2006 |
| JP | 2008087733 A | 4/2008 |
| JP | 2009205050 A | 9/2009 |
| JP | 5324901 B2 | 10/2013 |
| JP | 2016220312 | 12/2016 |
| KR | 100698177 B1 | 3/2007 |
| KR | 20150054641 A | 5/2015 |
| NZ | 274939 A | 6/1997 |
| NZ | 556646 | 7/2007 |
| NZ | 555128 A | 1/2010 |
| RU | 99667 | 11/2010 |
| SU | 736298 | 5/1980 |
| TW | M508836 U | 9/2015 |
| WO | 1989010651 A1 | 11/1989 |
| WO | 1993023909 A1 | 11/1993 |
| WO | 1995011545 A1 | 4/1995 |
| WO | 1998031073 A2 | 11/1998 |
| WO | 1998057413 A1 | 12/1998 |
| WO | 2003105308 A1 | 12/2003 |
| WO | 2003096512 A2 | 2/2004 |
| WO | 2005024865 A2 | 6/2005 |
| WO | 2006001557 A1 | 1/2006 |
| WO | 2008118178 A1 | 10/2008 |
| WO | 2008140333 | 11/2008 |
| WO | 2009023155 A3 | 2/2009 |
| WO | 2009050625 A2 | 4/2009 |
| WO | 2009081126 | 7/2009 |
| WO | 20110156768 | 12/2011 |
| WO | 2012018268 | 2/2012 |
| WO | 2012099965 | 7/2012 |
| WO | 2012125590 A2 | 9/2012 |
| WO | 2013011726 | 1/2013 |
| WO | 2013056234 | 4/2013 |
| WO | 2013112609 A1 | 8/2013 |
| WO | 2013112613 | 8/2013 |
| WO | 2013112614 | 8/2013 |
| WO | 2014130065 A1 | 8/2014 |
| WO | 2015085013 A1 | 6/2015 |
| WO | 2016113949 | 7/2016 |
| WO | 2018232416 A1 | 12/2018 |

OTHER PUBLICATIONS

Basar et al., Application of Wireless Power Transmission Systems in Wireless Capsule Endoscopy: An Overview. Sensor, 2014, 14, pp. 10932-10934.
Choi, "Generalized Models on Self-Decoupled Dual Pick-up Coils for Large Lateral Tolerance" IEEE Transactions on Power Electronics, vol. 30, No. 11, Nov. 2015, pp. 6434-6445 (Year: 2015).
drive2.com, Japanese puzzled wireless charging of electric vehicles, Pavel Greshnykh, 2016, https:/lwww.drive2.com/c/958023. Last visited Sep. 22, 2016.
European Application No. 18818426.1, Extended European Search Report dated Jun. 1, 2021.
European Application No. 18846305.3, Extended European Search Report dated Apr. 1, 2021.
International Application No. PCT/US2018/038125, International Search Report and Written Opinion dated Oct. 4, 2018.
International Application No. PCT/US2018/046757, International Search Report and Written Opinion dated Nov. 8, 2018.
Kaczmarczyk et al., A multi-coil wireless power transfer (MC-WPT) system—analysis method and properties, Measurement Automation Monitoring, Oct. 2015, vol. 61, No. 10, pp. 480-482.
Kim, Mina et al. "Design Methodology of a 500 W Wireless Power Transfer Converter", 2015 IEEE, 6 pages.
Li," A Novel WPT System Based on Dual Transmitters and Dual Receivers for High Power Applications: Analysis, Design and Implementation" Energies 2017, 10, 174, pp. 1-16 (Year: 2017).
Morozov A.G. Ejschtrotechnika, Ejstkronika and Pulse Technology. Moscow, "High School", 1987, p. 200 paragraph 4, machine translation of paragraph of included.
Mude et al., Design and experimentation of two-coil coupling for electric city-car WPT charging, Journal of Electromagnetic Waves and Applications, Nov. 29, 2015, p. 3.
Office Action for Chinese Application No. 201880053435.9, dated Oct. 12, 2020, 14 pages.
Notice of Allowance for U.S. Appl. No. 16/011,524, dated Oct. 3, 2018, 9 pages.
Corrected Notice of Allowance for U.S. Appl. No. 16/011,524, dated Jan. 14, 2019, 2 pages.
Non-Final Office Action for U.S. Appl. No. 16/103,512, dated May 29, 2020, 17 pages.
Notice of Allowance for U.S. Appl. No. 16/103,512, dated Mar. 10, 2021, 12 pages.
Non-Final Office Action for U.S. Appl. No. 16/273,992, dated Feb. 11, 2011, 21 pages.
Ahn et al., Design of Coupled Resonators for Wireless Power Transfer to Mobile Devices using Magnetic Field Shaping, 2012, IEEE, 44 pages.
Budhia et al., Design and Optimisation of Magnetic Structures for Lumped Inductive Power Transfer Systems, 2009, IEEE, 8 pages.
Chiang, Chao-Wen. Wireless Charging System with Magnetic Field Shaping for Electric Vehicles, 2013, IEEE, 5 pages.
Chinese Patent Application 201880053435.9, Office Action dated Oct. 12, 2020.
Chinese Patent Application 201880053435.9, Office Action dated Jul. 13, 2021, 9 pages.
Chinese Patent Application No. 201680050311.6, Office Action dated Apr. 2, 2021, 10 pages.
Covic et al., Inductive Power Transfer (IPT) Powering our future, 2010, The University of Auckland, Achland Uniservices Ltd., 126 pages.
Covic et al., The Design of a Contact-less Energy Transfer System For a People Mover System, 2000, IEEE, 6 pages.
Deyle et al., PowerPACK: A Wireless Power Distribution System for Wearable Devices, 2008, IEEE, 8 pages.
Dionne et al., Tunability of Microstrip Ferrite Resonator in the Partially Magnetized State, Sep. 1997, vol. 33, No. 5, IEEE, 3 pages.
Donaldson et al., Analysis of Resonant Coupled Coils in the Design of Radio Frequency Transcutaneous Links, 1983, Med. & Biol. Eng. & Comput., 16 pages.
Elliott et al., Magnetically Coupled Systemd for Power Transfer to Electric Vehicles, 1995, IEEE, 5 pages.
European Patent Application No. 18846305.3, EESR dated Apr. 1, 2021, 13 pages.
European Patent Application No. 18818426.1, Search Report dated Jun. 1, 2021, 11 pages.
Fang, et al., Design of Superconducting MRI Surface Coil by Using Method of Moment, Jun. 2002, vol. 12, No. 2, IEEE Transactions on Applied Superconductivity, 5 pages.
Fiedziuszko et al., Dielectric Resonators Raise Your High-Q, Sep. 2001, IEEE Microwave Magazine, 10 pages.
Finkenzeller, Klaus. RFID Handbook, 2003, Second Edition, Rachel Wddington Translation, Wiley, 163 pages.
Freire et al., Near-field imaging in the megahertz range by strongly coupled magnetoinductive surfaces: Experiment and ab initio analysis, Sep. 25, 2006, 10 pages.
Gao, Jianbo. Inductive Power Transmission for Untethered Micro-Robots, 2005, IEEE, 6 pages.

(56) References Cited

OTHER PUBLICATIONS

Gao, Jianbo. Traveling Magnetic Field for Homogeneous Wireless Power Transmission, Jan. 2007, vol. 22, No. 1, IEEE Transactions on Power Delivery, 8 pages.

Ghovanloo et al., A Wide-Band Power-Efficient Inductive Wireless Link for Implantable Microelectronic Devices Using Multiple Carriers, Nov. 2007, IEEE, 12 pages.

Gupta, Abheek. Inductor Geometries and Inductance Calculations for Power Transfer in Biomedical Implants, 2003, 95 pages.

Harrison, Reid R. Designing Efficient Inductive Power Links for Implantable Devices, 2007, IEEE, 4 pages.

Helszajn et al., Planar Triangular Resonators with Magnetic Walls, Feb. 1978, vol. MTT-26, No. 2, IEEE Transactions on Microwave Theory and Techniques, 6 pages.

Helszajn, Joseph. Quarter-Wave Coupled Junction Circulators Using Weakly Magnetized Disk Resonators, May 1982, vol. MTT-30, No. 5, IEEE Transactions on Microwave Theory and Techniques, 7 pages.

Hirayama et al., A Consideration of Electro-Magnetic-Resonant Coupling Mode in Wireless Power Transmission, Oct. 10, 2009, vol. 6, No. 19, IEEE Electronic Express, 5 pages.

Hmida et al., Design of Wireless Power and Data Transmission Circuits for Implantable Biomicrosystem, 2007, vol. 6, No. 2, Biotechnology, 13 pages.

Hormby, Tom. A History of Palm, Part 1: Before the PalmPilot, Jul. 19, 2016, Low End Mac, 31 pages. URL: https://lowendmac.com/2016/a-history-of-palm-part-1-before-the-palmpilot.

ICNIRP Guidelines for Limiting Exposure to Time-Varying Electric, Magnetic and Electromagnetic Fields (Up To 300 GHz), International Commission on Non-Ionizing Radiation Protection, 1998, Health Physics 74 (4):494-522, 38 pages.

IEEE Standard for Safety Levels with Respect to Human Exposure to Radio Frequency Electromagnetic Fields 2 kHz to 300 GHz, Apr. 19, 2006, IEEE Standard C95. Jan. 2005, 238 pages.

International Application No. PCT/US2016/039889, International Search Report and Written Opinion dated Oct. 6, 2016, 9 pages.

Jow et al., Design and Optimization of Printed Spiral Coils for Efficient Transcutaneous Inductive Power Transmission, Sep. 2007, vol. 1, No. 3, IEEE Transactions on Biomedical Circuts and Systems, 10 pages.

Karalis et al., Efficient Wireless Non-Radiative Mid-Range Energy Transfer, Apr. 27, 2007, ScienceDirect, 15 pages.

Kim et al., "Design methodology of a 1-15 500 W wireless power transfer converter", 2015 IEEE PELS Workshop on Emerging Technologies: Wireless Power (2015 WOW), IEEE, Jun. 5, 2015 (Jun. 5, 2015), pp. 1-6, XP032789382, DOI: 10.1109/WOW.2015.7132842 [retrieved on Jun. 24, 2015].

Koenderink et al., Controlling the Resonance of a Photonic Crystal Microcavity by a Near-Field Probe, Oct. 5, 2005, Physical Review Letters, 4 pages.

Kurs et al., Power Transfer Through Strongly Coupled Resonances, Sep. 2007, Massachusetts Institute of Technology, 42 pages.

Kurs et al., Wireless Power Transfer via Strongly Coupled Magnetic Resonances, Jul. 6, 2007, vol. 317, Science, 5 pages.

Leén et al., Full-Wave Analysis of a Wide Class of Microstrip Resonators Fabricated on Magnetized Ferrites With Arbitrarily Oriented Bias Magnetic Field, Jun. 2002, vol. 50, No. 6, IEEE Transactions on Microwave Theory and Techniques, 10 pages.

León et al., Full-Wave Analysis of Tuneable Microstrip Filters Fabricated on Magnetized Ferrites, 2003, IEEE, 4 pages.

Liu et al., Equivalent Circuit Modeling of a Multilayer Planar Winding Array Structure for Use in a Universal Contactless Battery Charging Platform, Jan. 2007, IEEE Transactions on Power Electronics, vol. 22 No. 1, 9 pages.

Maslovski et al., Near-field enhancement and imaging in double planar polariton-resonant structures, Oct. 7, 2018, Physics Optics, 8 pages.

Mohan et al., Power Electronics, 1995, Second Edition, Wiley, 45 pages.

Nakao et al., Ferrite Core Couplers for Inductive Chargers, 2002, IEEE, 5 pages.

Oates et al., Magnetically Tunable Superconducting Resonators and Filters, Jun. 1999, vol. 9, No. 2, IEEE Transactions on Applied Superconductivity, 6 pages.

O'Brien, Kathleen. Inductively Coupled Radio Frequency Power Transmission System for Wireless Systems and Devices, 2007, Shker Verlag, Momentum Dynamics Corporation, 198 pages.

O'Donnell et al., Inductive Powering of Sensor Modules, 2005, IEEE, 6 pages.

Sakamoto et al., Large Air-Gap Coupler for Inductive Charger, Sep. 1999, vol. 35, No. 5, IEEE Transactions on Magnetics, 3 pages.

Schmidt, Stephan. Finite-Difference Time-Domain Methods for Electromagnetic Problems Involving Biological Bodies, 2005, 95 pages.

Segan, Sascha. The Evolution of the Blackberry, Jan. 28, 2013, PC Mag, 23 pages. URL: https://www.pcmag.com/news/the-evolution-of-the-blackberry-from-957-to-z10.

Shen et al., Tunable Dielectric Resonators with Dielectric Tuning Disks, Dec. 2000, vol. 48, No. 12, IEEE Transactions on Microwave Theory and Techniques, 7 pages.

Singh et al., Evolution of Processor Architecture in Mobile Phones, Mar. 2014, vol. 40 No. 4, International Journal of Computer Applications, 6 pages.

Stark III, Joseph C. Wireless Power Transmission Utilizing A Phased Array Of Tesla Coils, May 2004, 247 pages.

Stielau et al., Design of Loosely Coupled Inductive Power Transfer Systems, 2000, IEEE, 6 pages.

Tang et al., A Low-Profile Power Converter Using Printed-Circuit Board (PCB) Power Transformer with Ferrite Polymer Composite, Jul. 2001, vol. 16, No. 4, IEEE Transactions on Power Electronics, 6 pages.

Tang et al., Evaluation of the Shielding Effects on Printed-Circuit-Board Transformers Using Ferrite Plates and Copper Sheets, Nov. 2002, IEEE, 7 pages.

Tang et al., Evaluation of the Shielding Effects on Printed-Circuit-Board Transformers Using Ferrite Plates, 2001, IEEE, 7 pages.

Terman et al., Electronic and Radio Engineering, 1947, Fourth Edition, McGraw-Hill Book Company, 171 pages.

Thiruvenkatanathan et al., Differential Amplification of Structural Perturbations in Weakly Coupled MEMS Resonators, Mar. 2010, vol. 57, No. 3, IEEE Transactions on Ultrasonics, Ferrolectrics, and Frequency Control, 8 pages.

U.S. Appl. No. 16/273,992, Office Action dated Feb. 11, 2021, 36 pages.

U.S. Appl. No. 16/273,992, Office Action dated Sep. 16, 2021, 19 pages.

Vandevoorde et al., Wireless energy transfer for stand-alone systems: a comparison between low and high power applicability, Nov. 24, 2000, Elsevier, 7 pages.

Wang et al., General Stability Criterions for Zero Phase Angle Controlled Loosely Coupled Inductive Power Transfer Systems, 2001, IEEE, 6 pages.

Wang et al., Investigating an LCL Load Resonant Inverter for Inductive Power Transfer Applications, Jul. 2004, vol. 9, No. 4, IEEE Transactions on Power Electronics, 8 pages.

Wang et al., Power Transfer Capability and Bifurcation Phenomena of Loosely Coupled Inductive Power Transfer Systems, Feb. 2004, vol. 51, No. 1, IEEE Transactions on Industrial Electronics, 10 pages.

Wang, Chwei-Sen. Design Considerations for Inductively Coupled Power Transfer Systems, University of Auckland, Oct. 21, 2004, 282 pages.

Zierhofer et al., Coil Design For Improved Power Transfer Efficiency In Inductive Links, 1996, IEEE, 2 pages.

Chinese Patent Application No. 201680050311.6, Office Action dated Oct. 14, 2021, 9 pages.

U.S. Appl. No. 16/273,992, Notice of Allowance dated Feb. 16, 2022, 59 pages.

Chinese Patent Application No. 201880053435.9, Office Action dated May 11, 2022, 9 pages.

(56) References Cited

OTHER PUBLICATIONS

U.S. Appl. No. 16/273,992, Notice of Allowance dated Apr. 29, 2022, 50 pages.

* cited by examiner

DC LINK CHARGING OF CAPACITOR IN A WIRELESS POWER TRANSFER PAD

CROSS-REFERENCES TO RELATED APPLICATIONS

This application claims the benefit of U.S. Provisional Patent Application No. 62/623,777 entitled "DC LINK CHARGING OF CAPACITOR IN A WIRELESS POWER TRANSFER PAD" and filed on Jan. 30, 2018 for Patrice Lethellier, which is incorporated herein by reference.

FIELD

This invention relates to wireless power transfer and more particularly relates to DC link charging of a capacitor in a wireless power transfer pad.

BACKGROUND

Wireless power transfer is an emerging field and power levels have increased to the point that wireless power transfer is now used for wireless charging of vehicles. As power levels increase, component sizes increase, including capacitors used for filtering and other purposes.

SUMMARY

An apparatus for wireless power transfer is disclosed. An alternate apparatus and a system perform the functions of the apparatus. The apparatus includes a wireless power transfer ("WPT") pad, a secondary circuit with a rectification section that receives power from the WPT pad, a capacitor, and a first rectification device connected to the capacitor. The capacitor and first rectification device are connected in parallel with the rectification section and in parallel with a load. The apparatus includes a second rectification device connected to the rectification section and an intermediate node between the capacitor and first rectification device.

Another apparatus for wireless power transfer includes a wireless power transfer ("WPT") pad, a secondary circuit with a rectification section that receives power from the WPT pad, a capacitor, and a first rectification device connected to the capacitor. The capacitor and first rectification device are connected in parallel with the rectification section and in parallel with a load. The first rectification device includes a blocking diode and the load includes a battery. The apparatus includes a second rectification device connected to the rectification section and an intermediate node between the capacitor and first rectification device, where the second rectification device includes a charging diode. The rectification section includes a full-bridge rectifier with two series-connected diodes in a first leg connected between a positive bus that connects the rectification section to the load and a return and a second leg with two series-connected diodes where an anode of a first charging diode of the second rectification device is connected between the diodes of the first leg and an anode of a second charging diode of the second rectification device is connected between the diodes of the second leg.

A system for wireless power transfer includes a power converter apparatus connected to a power source and a secondary receiver apparatus mounted to a vehicle. The secondary receiver apparatus is configured to receive power wirelessly from the power converter apparatus with a primary WPT pad. The secondary receiver apparatus includes a secondary WPT pad, a secondary circuit with a rectification section that receives power from the secondary WPT pad, a capacitor, and a first rectification device connected to the capacitor. The capacitor and first rectification device are connected in parallel with the rectification section and in parallel with a load of the vehicle. The secondary receiver apparatus includes a second rectification device connected to the rectification section and an intermediate node between the capacitor and first rectification device.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

An apparatus for wireless power transfer is disclosed. An alternate apparatus and a system perform the functions of the apparatus. The apparatus includes a wireless power transfer ("WPT") pad, a secondary circuit with a rectification section that receives power from the WPT pad, a capacitor, and a first rectification device connected to the capacitor. The capacitor and first rectification device are connected in parallel with the rectification section and in parallel with a load. The apparatus includes a second rectification device connected to the rectification section and an intermediate node between the capacitor and first rectification device.

In some embodiments, the first rectification device is a low impedance for current from the capacitor to the load and a high impedance for current from the load to the capacitor. In other embodiments, the first rectification device includes a blocking diode and an anode of the blocking diode is connected to the capacitor and a cathode of the blocking diode is connected to a positive bus that connects the rectification section to the load. In other embodiments, the load includes a battery. In other embodiments, the second rectification device is a low impedance for current from the capacitor to the rectification section and a high impedance for current from the rectification section to the capacitor.

In some embodiments, the second rectification device includes a charging diode. The charging diode has a cathode connected to the intermediate node. In other embodiments, the rectification section includes a full-bridge rectifier with two series-connected diodes in a first leg connected between a positive bus that connects the rectification section to the load and a return and a second leg includes two series-connected diodes. An anode of a first charging diode of the second rectification device is connected between the diodes of the first leg and an anode of a second charging diode of the second rectification device is connected between the diodes of the second leg. In further embodiments, the diodes of the first leg and the diodes of the second leg are connected in series with the cathode of each diode oriented toward the positive bus and the WPT pad provides power to a point between each pair of diodes in the first leg and in the second leg.

In some embodiments, the secondary circuit further includes a tuning section with an inductor and/or a capacitor, where the tuning section is connected between the WPT pad and the rectification section. In other embodiments, the WPT pad includes a ferrite structure with a planar surface and a winding wound adjacent to the planar surface where the winding is in a spiral-type configuration. In other embodiments, the WPT pad includes one or more capacitors in series with one or more windings of the WPT pad. In further embodiments, the WPT pad is a secondary WPT pad that receives power from a primary WPT pad positioned with a gap between the primary and secondary WPT pads and power is transferred wirelessly across the gap. In other embodiments, the primary and secondary WPT pads transfer power with an alternating current ("AC") waveform that is rectified by the rectification section.

Another apparatus for wireless power transfer includes a wireless power transfer ("WPT") pad, a secondary circuit with a rectification section that receives power from the WPT pad, a capacitor, and a first rectification device connected to the capacitor. The capacitor and first rectification device are connected in parallel with the rectification section and in parallel with a load. The first rectification device includes a blocking diode and the load includes a battery. The apparatus includes a second rectification device connected to the rectification section and an intermediate node between the capacitor and first rectification device, where the second rectification device includes a charging diode. The rectification section includes a full-bridge rectifier with two series-connected diodes in a first leg connected between a positive bus that connects the rectification section to the load and a return and a second leg with two series-connected diodes where an anode of a first charging diode of the second rectification device is connected between the diodes of the first leg and an anode of a second charging diode of the second rectification device is connected between the diodes of the second leg.

In some embodiments, an anode of the blocking diode is connected to the capacitor and a cathode of the blocking diode is connected to a positive bus that connects the rectification section to the load and the charging diode has a cathode connected to the intermediate node. In other embodiments, the diodes of the first leg and the diodes of the second leg are connected in series with the cathode of each diode oriented toward the positive bus and the WPT pad provides power to a point between each pair of diodes in the first leg and in the second leg. In other embodiments, the secondary circuit includes a tuning section with an inductor and/or a capacitor. The tuning section is connected between the WPT pad and the rectification section.

In some embodiments, the WPT pad includes a ferrite structure with a planar surface and a winding wound adjacent to the planar surface where the winding is in a spiral-type configuration. In other embodiments, the WPT pad includes one or more capacitors in series with one or more windings of the WPT pad and the WPT pad is a secondary WPT pad that receives power from a primary WPT pad positioned with a gap between the primary and secondary WPT pads and power is transferred wirelessly across the gap.

A system for wireless power transfer includes a power converter apparatus connected to a power source and a secondary receiver apparatus mounted to a vehicle. The secondary receiver apparatus is configured to receive power wirelessly from the power converter apparatus with a primary WPT pad. The secondary receiver apparatus includes a secondary WPT pad, a secondary circuit with a rectification section that receives power from the secondary WPT pad, a capacitor, and a first rectification device connected to the capacitor. The capacitor and first rectification device are connected in parallel with the rectification section and in parallel with a load of the vehicle. The secondary receiver apparatus includes a second rectification device connected to the rectification section and an intermediate node between the capacitor and first rectification device.

Figure 1:
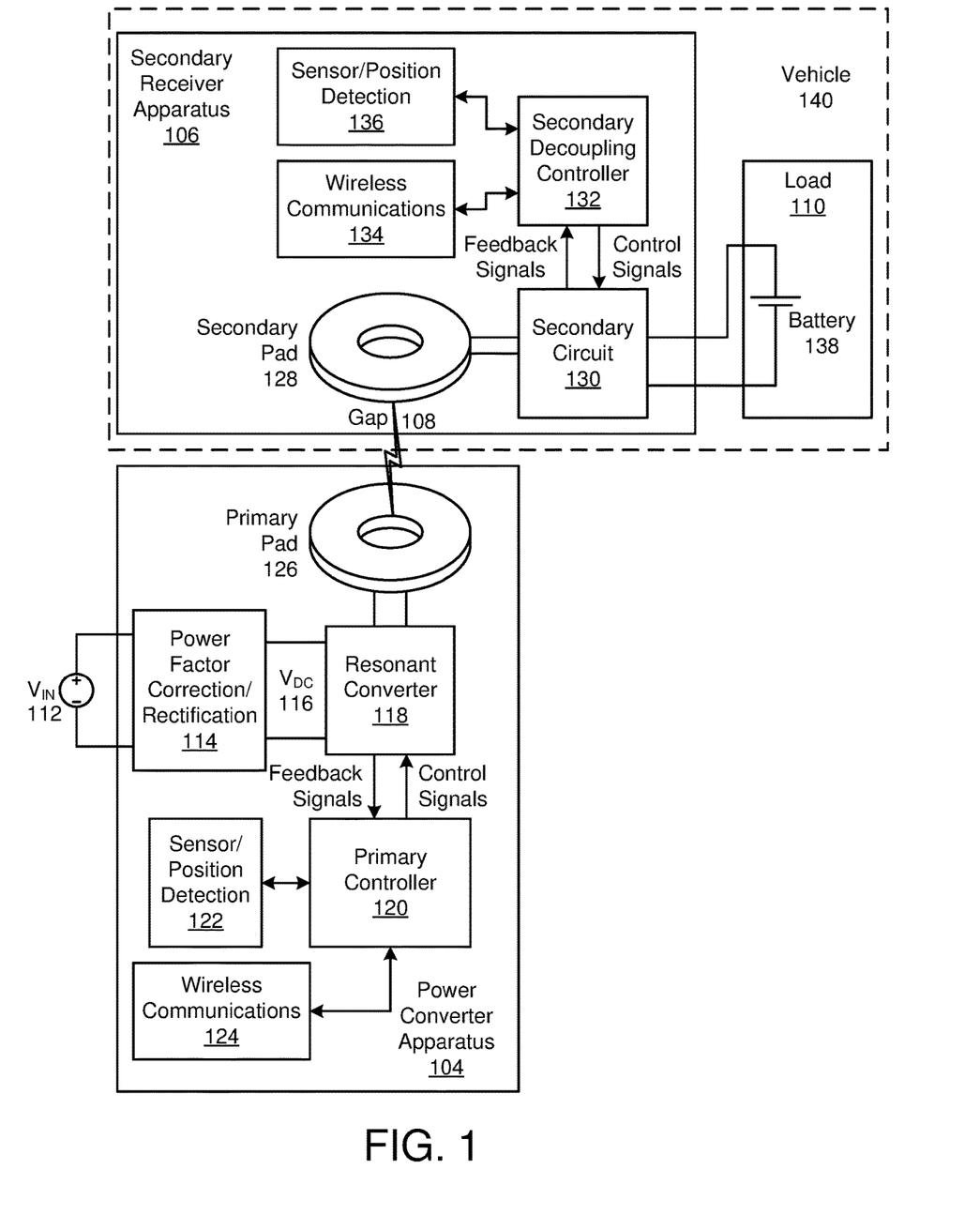
FIG. 1 is a schematic block diagram illustrating one embodiment of a system with a low voltage wireless power transfer ("WPT") pad.

FIG. 1 is a schematic block diagram illustrating one embodiment of a wireless power transfer ("WPT") system 100 with a low voltage WPT pad. The WPT system 100 includes a power converter apparatus 104 and a secondary receiver apparatus 106 separated by a gap 108, and a load 110, which are described below.

The WPT system 100 includes a power converter apparatus 104 that receives power from a power source 112 and transmits power over a gap 108 to a secondary receiver apparatus 106, which transfers power to a load 110. The power converter apparatus 104, in one embodiment, may be called a switching power converter and includes a resonant converter 118 that receives a direct current ("DC") voltage from a DC bus 116.

In one embodiment, the power source 112 provides DC power to the DC bus 116. In another embodiment, the power source 112 is an alternating current ("AC") power source, for example from a building power system, from a utility, from a generator, etc. and the power converter apparatus 104 includes a form of rectification to provide DC power to the DC bus 116. For example, the rectification may be in the form of a power factor correction and rectification circuit 114. In the embodiment, the power factor correction and rectification circuit 114 may include an active power factor correction circuit, such as a switching power converter. The power factor correction and rectification circuit 114 may also include a full-bridge rectifier, a half-bridge rectifier, or other rectification circuit that may include diodes, capacitors, surge suppression, etc.

The resonant converter 118 may be controlled by a primary controller 120, which may vary parameters within the resonant converter 118, such as conduction time, conduction angle, duty cycle, switching, etc. The primary controller 120 may receive information from sensors and position detection 122 within or associated with the power converter apparatus 104. The primary controller 120 may also receive information wirelessly from the secondary receiver apparatus 106.

The power converter apparatus 104 includes a primary pad 126 (i.e. a primary WPT pad) that receives power from the resonant converter 118. In one embodiment, portions of the resonant converter 118 and primary pad 126 form a resonant circuit that enables efficient wireless power transfer across the gap 108. In another embodiment, the power converter apparatus 104 includes a switching power converter that is not a resonant converter. The gap 108, in some embodiments includes an air gap, but may also may partially or totally include other substances. For example, where the primary pad 126 is in a roadway, the gap 108 may include a resin, asphalt, concrete or other material just over the windings of the primary pad 126 in addition to air, snow, water, etc. between the primary pad 126 and a secondary pad 128 located in the secondary receiver apparatus 106.

The secondary receiver apparatus 106 includes a secondary pad 128 (i.e. a secondary WPT pad) connected to a secondary circuit 130 that delivers power to the load 110. The secondary receiver apparatus 106 may also include a secondary decoupling controller 132 that controls the secondary circuit 130 and may also be in communication with sensors and/or position detection 136 and wireless communications 134 coupled to the power converter apparatus 104.

In one embodiment, the secondary receiver apparatus 106 and load 110 are part of a vehicle 140 that receives power from the power converter apparatus 104. The load 110 may include a battery 138, a motor, a resistive load, a circuit or other electrical load. For example, the WPT system 100 may transfer power to a portable computer, a consumer electronic device, to an industrial load, or other portable load that would benefit from receiving power wirelessly.

In one embodiment, the secondary circuit 130 includes a portion of resonant circuit that interacts with the secondary pad 128 and that is designed to receive power at a resonant frequency. In another embodiment, the secondary circuit 130 includes a power conditioning circuit that is not a resonant circuit. The secondary circuit 130 may also include a rectification circuit, such as a full-bridge rectifier, a half-bridge rectifier, and the like. In another embodiment, the secondary circuit 130 includes a power converter of some type that receives power from the resonant circuit/rectifier and actively controls power to the load 110. For example, the secondary circuit 130 may include a switching power converter. In another embodiment, the secondary circuit 130 includes passive components and power to the load 110 is controlled by adjusting power in the power converter apparatus 104. In another embodiment, the secondary circuit 130 includes an active rectifier circuit that may receive and transmit power. One of skill in the art will recognize other forms of a secondary circuit 130 appropriate for receiving power from the secondary pad 128 and delivering power to the load 110.

The resonant converter 118, in one embodiment, includes an active switching section coupled to a resonant circuit formed with components of the resonant converter 118 and the primary pad 126. The resonant converter 118 is described in more detail with regard to FIG. 2.

Figure 2:
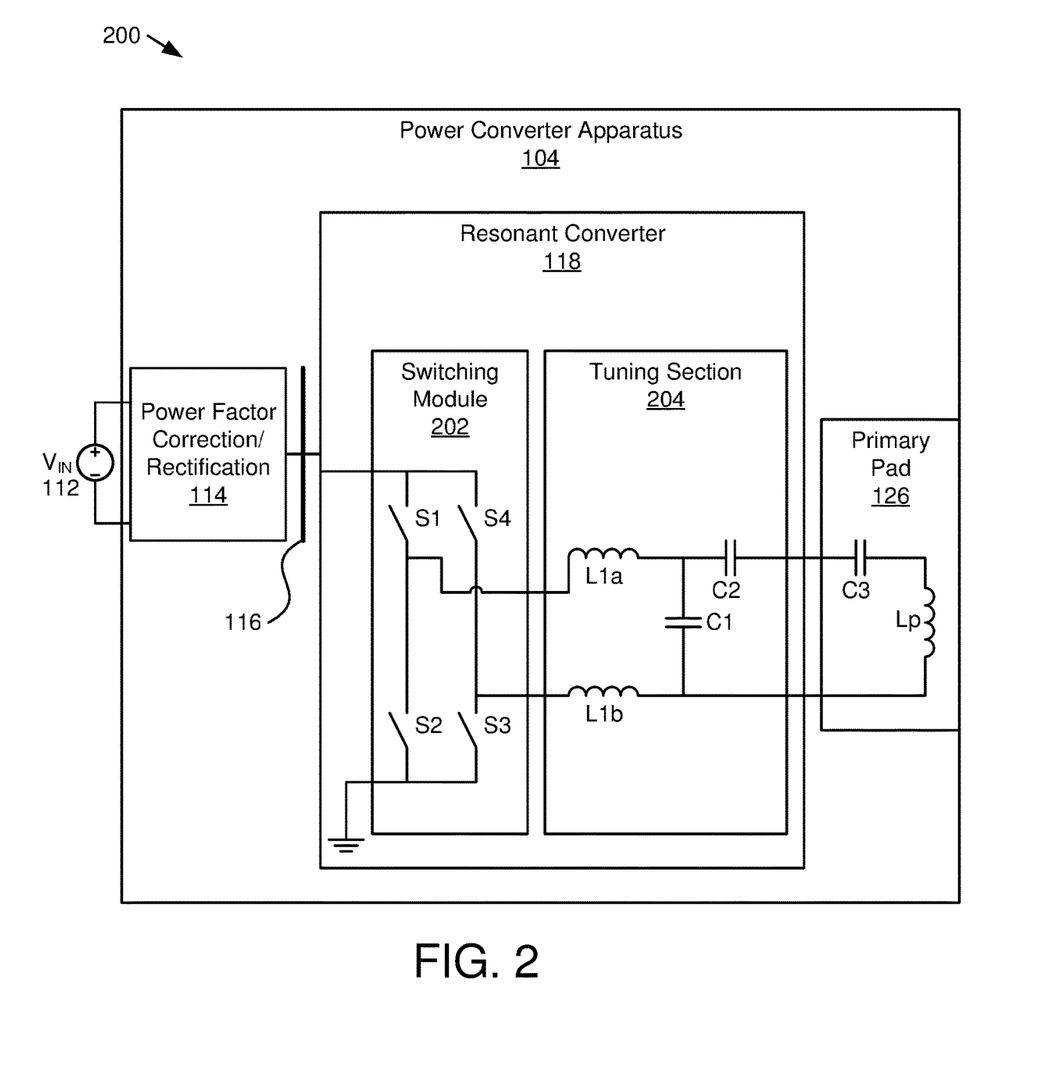
FIG. 2 is a schematic block diagram illustrating one embodiment of a power converter apparatus.

FIG. 2 is a schematic block diagram illustrating one embodiment of a power converter apparatus 104. The power converter apparatus 104 is connected to a power source 112 and includes a power factor correction and rectification circuit 114 connected to a DC bus 116 feeding a resonant converter 118 connected to a primary pad 126 as described with regard to the WPT system 100 of FIG. 1.

The resonant converter 118 includes a switching module 202 and a tuning section 204. In one embodiment, the switching module 202 includes four switches configured to connect the DC bus 116 and to ground. Typically, switches S1 and S3 close while switches S2 and S4 are open and vice-versa. When switches S1 and S3 are closed, the DC bus 116 is connected to a positive connection of the tuning section 204 through inductor L1a and the ground is connected to the negative connection of the tuning section 204 through inductor L1b while switches S2 and S4 are open. When switches S2 and S4 are closed and switches S1 and S3 opened, the ground is connected to the positive terminal of the tuning section 204 and the DC bus 116 is connected to the positive connection of the tuning section 204. Thus, the switching module 202 alternates connection of the DC bus 116 and ground to the tuning section 204 simulating an AC waveform. The AC waveform is typically imperfect due to harmonics.

Typically, switches S1-S4 are semiconductor switches, such as a metal-oxide-semiconductor field-effect transistor ("MOSFET"), a junction gate field-effect transistor ("JFET"), a bipolar junction transistor ("BJT"), an insulated-gate bipolar transistor ("IGBT") or the like. Often the switches S1-S4 include a body diode that conducts when a negative voltage is applied. In some embodiments, the timing of opening and closing switches S1-S4 are varied to achieve various modes of operations, such as zero-voltage switching.

The tuning section 204 of the resonant converter 118 and the primary pad 126 are designed based on a chosen topology. For example, the resonant converter 118 and primary pad 126 may form an inductor-capacitor-inductor ("LCL") load resonant converter, a series resonant converter, a parallel resonant converter, and the like. The embodiment depicted in FIG. 2 includes an LCL load resonant converter.

Resonant converters include an inductance and capacitance that form a resonant frequency. When a switching frequency of the tuning section 204 is at or close to the resonant frequency, voltage with the tuning section 204 and primary pad 126 often increases to voltages levels higher than the voltage of the DC bus 116. For example, if the voltage of the DC bus 116 is 1 kilovolt ("kV"), voltage in the tuning section 204 and resonant converter 118 may be 3 kV or higher. The high voltages require component ratings, insulation ratings, etc. to be high enough for expected voltages.

The primary pad 126 includes capacitor C3 and inductor Lp while the tuning section 204 includes series capacitor C2. Capacitors C2 and C3 add to provide a particular capacitance that forms a resonant frequency with inductor Lp. While FIG. 2 includes a series capacitor C2 in the tuning section 204 and a series capacitor C3 in the primary pad 126, other embodiments may include a single series capacitor in either the tuning section 204 or in the primary pad 126. Other embodiments may include additional series capacitors, for example in the positive and return lines.

Figure 3A:
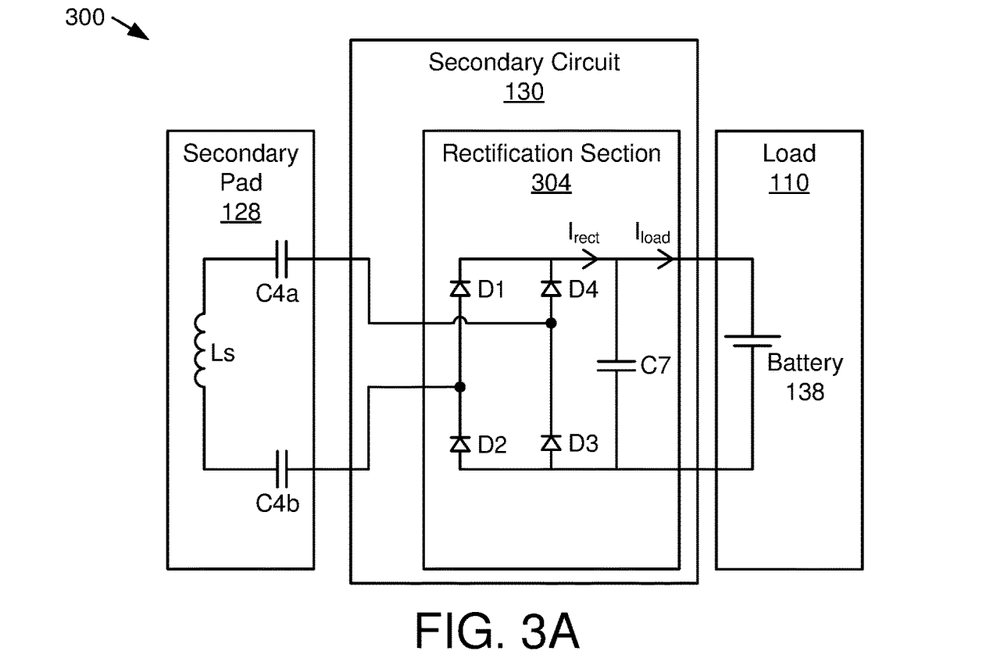
FIG. 3A is a schematic block diagram illustrating one embodiment of a secondary circuit with a rectification circuit, the secondary circuit feeding a load.
Figure 3B:
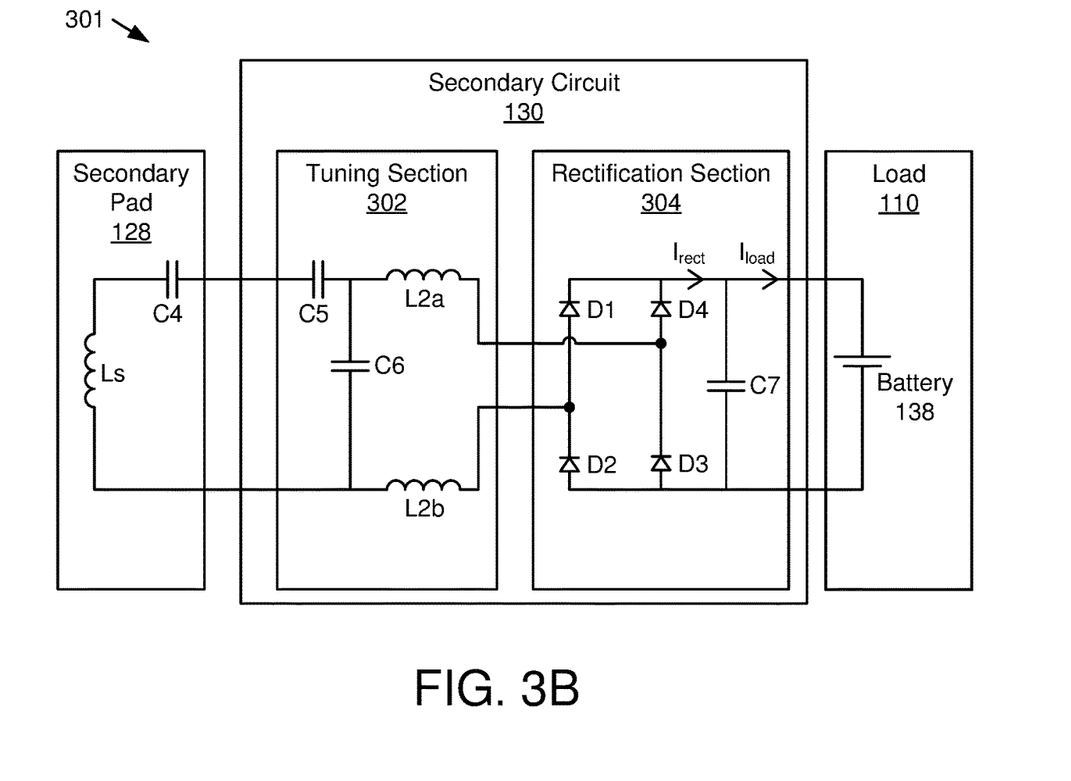
FIG. 3B is a schematic block diagram illustrating one embodiment of a secondary circuit with a rectification section and a tuning section where the secondary is circuit feeding a load.

While FIG. 2 is focused on the resonant converter 118 and primary pad 126 of the power converter apparatus 104, the secondary receiver apparatus 106 may include a secondary pad 128 and a secondary circuit 130 that may also include a tuning section 204, where the inductance of the secondary pad 128 and capacitance of the tuning section 204 of the secondary circuit 130 form a resonant frequency, as explained with regard to FIG. 3. The secondary pad 128 and secondary circuit 130 have voltage rating issues similar to the primary pad 126 and resonant converter 118. In other embodiments, the tuning section 204 and primary pad 126 are not designed to produce a resonance, but instead condition voltage from the switching module 202. For example, the tuning section 204 may filter out harmonic content without filtering a switching frequency.

FIG. 3A is a schematic block diagram illustrating one embodiment 300 of a secondary circuit 130 with a rectification section 304, where the secondary circuit 130 feeds a load 110. A secondary pad 128 feeds a rectification section 304 in the secondary circuit 130, which feeds a load 110. In some embodiments described herein, the secondary pad 128 is referred to as a WPT pad 128. The secondary pad 128 includes one or more windings arranged to receive power from a primary pad 126. The secondary pad 128 may include a ferrite structure with a planar surface and windings adjacent to the planar surface of the ferrite structure arranged in a pattern that efficiently receives power from the primary pad 126. For example, the windings may be arranged in a spiral-type configuration. In one embodiment, the secondary pad 128 mirrors the primary pad 126 that transmits power. In another embodiment, the secondary pad 128 differs from the primary pad 126. Typically, the secondary pad 128 includes an inductance Ls formed as a result of the windings and the ferrite structure of the secondary pad 128. In one embodiment, the secondary pad 128 includes two capacitors C4a and C4b as depicted, but the capacitors C4a, C4b may be combined into a single capacitor C4.

A rectification section 304 of the secondary circuit 130 includes diodes, switches, or other rectification elements to convert alternating current ("AC") power to direct current ("DC") power. The rectification section 304 depicted in FIG. 3A includes a full bridge rectifier with four diodes D1-D4. In some embodiments, the diodes D1-D4 are replaced with active elements, such as switches, which may be used to reduce harmonics, reduce power consumption, and the like. For example, the rectification section 304 may include a switching power converter that controls an output voltage to the load 110. In another embodiment, the diodes are replaced with solid state devices that include a rectification section. For example, the switches may be semiconductor switches, such as a metal-oxide-semiconductor field-effect transistor ("MOSFET"), a junction gate field-effect transistor ("JFET"), a bipolar junction transistor ("BJT"), silicon-controlled rectifiers ("SCR"), an insulated-gate bipolar transistor ("IGBT") or the like. The switches may have a lower power consumption than diodes while performing a same function as a diode. For example, the switches may be controlled to turn on when a diode would be forward biased and turn off when a diode is reverse biased. In addition, the switches may include a body diode.

In one embodiment, the rectification section 304 includes a full-bridge rectifier with two series-connected diodes D1, D2 in a first leg connected between a positive bus that connects the rectification section 304 to the load 110 and to a return. In the embodiment, the rectification section 304 includes a second leg with two series-connected diodes D3, D4 also connected between the positive bus and the return. In another embodiment, the diodes D1, D2 of the first leg and the diodes D3, D4 of the second leg are connected in series with the cathode of each diode D1-D4 oriented toward the positive bus. The secondary pad 128 provides power to the point between each pair of diodes D1 and D2, D3 and D4 in the first let and in the second leg.

The load 110, in one embodiment is a battery 138. In other embodiments, the load 110 may include other components, such as a motor, a resistive load, electronics, and the like. In one embodiment, the secondary pad 128, secondary circuit 130 and load 110 are part of a vehicle 140. In other embodiments, the secondary pad 128, secondary circuit 130 and load 110 are part of a computing device, a smartphone, and the like.

FIG. 3B is a schematic block diagram illustrating one embodiment 301 of a secondary circuit 130 with a rectification section 304 and a tuning section 302 where the secondary circuit 130 is feeding a load 110. A secondary pad 128 feeds a tuning section 302 within the secondary circuit 130 and the tuning section 302 feeds a rectification section 304 in the secondary circuit 130, which feeds a load 110. For the embodiments 300, 301 of FIGS. 3A and 3B, the rectification section 304 receives power from the secondary pad 128, directly or the tuning section 302. The secondary pad 128 of the embodiment 300 of FIG. 3A or the tuning section 302 of the embodiment 301 of FIG. 3B is connected to the same location in the rectification section 304. In one embodiment, the secondary pad 128 includes a single capacitor C4.

The tuning section 302 includes one or more capacitors C5, C6 and inductors L2a, L2b that are arranged to form a resonant circuit with the secondary pad 128 with a resonant frequency. In some embodiments, capacitor C6 is not present. In one embodiment, the resonant frequency matches a resonant frequency of the primary pad 126 transmitting power. Typically, a resonant frequency is formed between the inductor Ls of the secondary pad 128 and series capacitors C4 and C5 of the secondary pad 128 and/or tuning section 302. In some embodiments, the secondary pad 128 or the tuning section 302 include a single series capacitor C4 or C5. Other capacitors (e.g. C6) and inductors (e.g. L2a, L2b) may form a low pass filter to reduce voltage ripple at the resonant frequency. In other embodiments, a low-pass filter is included after rectification elements in the rectification section 304. A capacitor C7 is included in the embodiments described herein. One of skill in the art will recognize other configurations of the tuning section 302 that form a resonant tank with the secondary pad 128 and pass energy to the rectification section 304 or another suitable circuit.

Figure 4A:
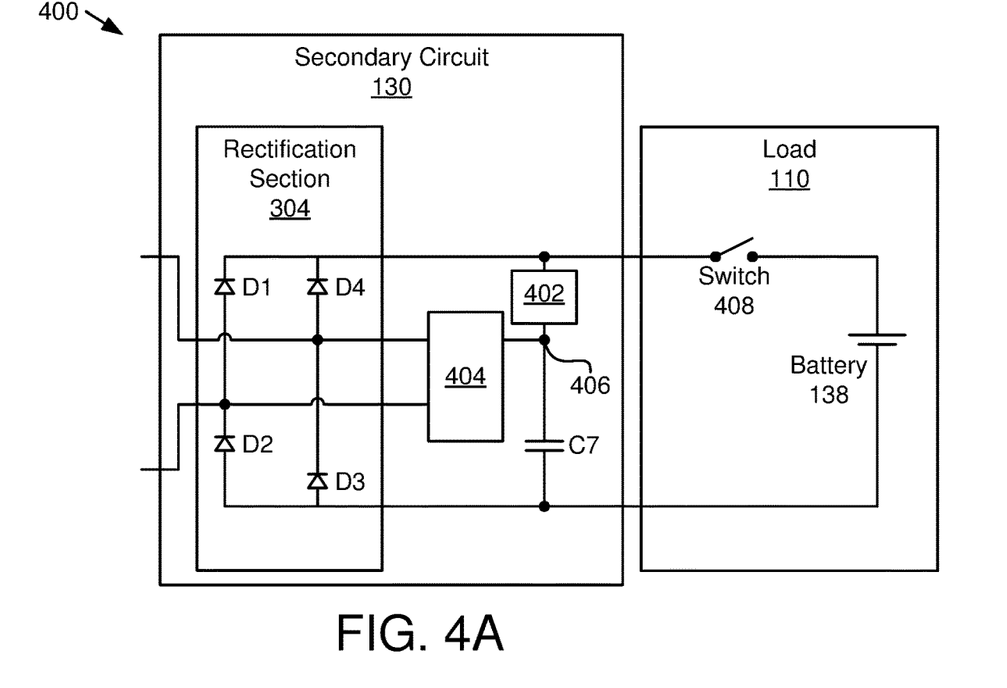
FIG. 4A is a schematic block diagram illustrating one embodiment of a rectification section feeding a load and a coil charged direct current ("DC") link capacitor.

FIG. 4A is a schematic block diagram illustrating one embodiment 400 of a rectification section 304 feeding a load 110 and a coil charged direct current ("DC") link capacitor C7. For convenience, the capacitor C7 is depicted outside the rectification section 304. The secondary circuit 130 includes a first rectification device 402 is connected to the capacitor C7. The capacitor C7 and the first rectification device 402 are connected in parallel with the rectification section 304 and in parallel with the load 110. In addition, the secondary circuit 130 includes a second rectification device 404 connected to the rectification section 304 and an intermediate node 406 between the capacitor C7 and first rectification device 402.

The first rectification device 402, in one embodiment, is a low impedance for current from the capacitor C7 to the load 110 and a high impedance for current from the load 110 to the capacitor C7. For example, the first rectification device 402 may have a diode-type function where when the first rectification device 402 is reverse biased, impedance of first rectification device 402 increases to minimize current from the load 110 to the capacitor C7. This provides a convenient way to block inrush current to the capacitor C7 when the load 110 is connected. For example, when the load is a battery 138, a switch 408 may be included and when closed may provide a high inrush current to the capacitor C7 without the first rectification device 402. Where the first rectification device 402 is included, the first rectification device 402 essentially blocks inrush current.

In other systems, a diode may be placed in series with the load 110. However, the entire current to the load 110 passes through the diode, which causes a tremendous power loss. In a functioning 50 kilowatt ("kW") system, the diode loss was around 1 kW. Another approach is to put a switch and resistor in parallel with the switch 408 to the load 110. However, this method introduces another mechanical part that introduces another failure mode and the mechanical switch may fail more often than other solid-state parts. While a solid-state switch may be used, in larger systems and for safety reasons, a mechanical switch may be required.

The first rectification device 402 provides a blocking function at a lower power loss. Current through the first rectification device 403 is typically limited to some ripple current from the capacitor C7 towards the load 110.

The second rectification device 404, provides power from the rectification section 304 to the capacitor C7, which may act to charge the capacitor C7 when voltage on the capacitor C7 is low, for example at startup. In one embodiment, the second rectification device 404 is a low impedance for current from the capacitor C7 to the rectification section 304 and a high impedance for current from the rectification section 304 to the capacitor C7. For example, the second rectification device 404 may include a diode-type function for each leg of the rectification section 304. In one embodiment, when voltage on a leg of the rectification section 304 increases, the second rectification device 404 conducts current to the capacitor C7 when the voltage of the leg of the rectification section 304 is above a voltage of the capacitor C7.

In some embodiments, the secondary pad 128 and secondary circuit 130 provide a controllable current source so that current through the second rectification device 404 is controlled to an appropriate level to prevent damage to the capacitor C7. As current in a leg of the rectification section 304 increases, voltage rises to a level to conduct current through the second rectification device 404. Beneficially, pre-charging of the capacitor C7 does not depend on the load 110.

Figure 4B:
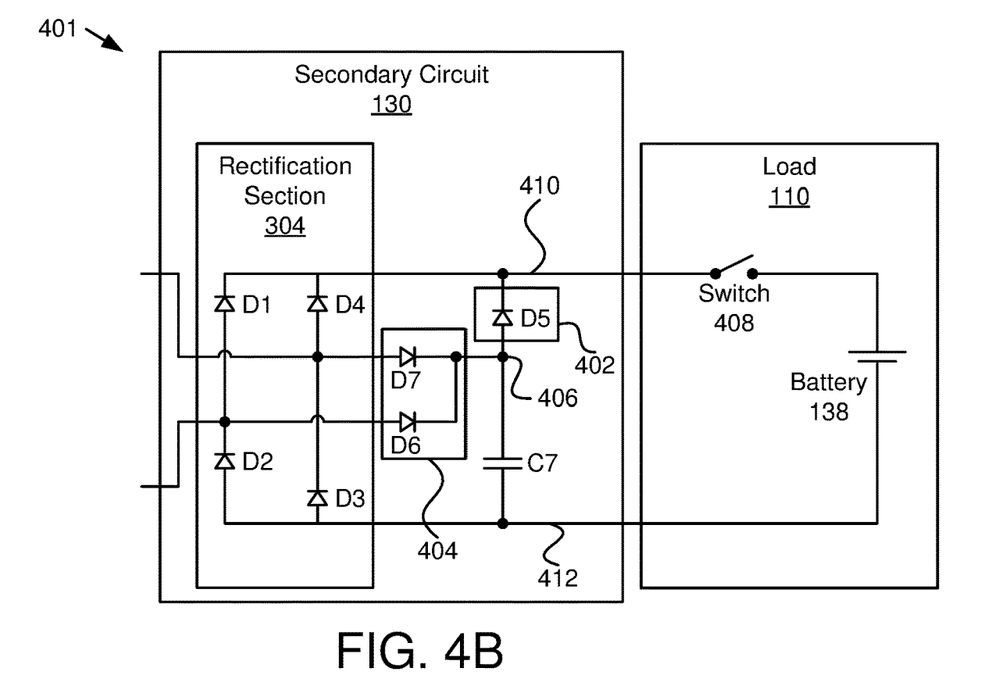
FIG. 4B is a schematic block diagram illustrating another embodiment of a rectification section feeding a load and a coil charged DC link capacitor.

FIG. 4B is a schematic block diagram illustrating another embodiment 401 of a rectification section 304 feeding a load 110 and a coil charged DC link capacitor C7. The embodiment 401 of FIG. 4B includes a blocking diode D5 in the first rectification device 402 where the anode of the blocking diode D5 is connected to the capacitor C7 and a cathode of the blocking diode D5 is connected to a positive bus 410 that connects the rectification section 340 to the load 110.

In other embodiments, the blocking diode D5 is replaced by another device that provides a blocking diode D5 function. For example, the blocking diode D5 may be replaced with a switch with a diode function or a switch that closes when the first rectification device 402 is intended to conduct and is off when the first rectification device 402 is intended to block current from the load 110. The switches may be semiconductor switches, such as a metal-oxide-semiconductor field-effect transistor ("MOSFET"), a junction gate field-effect transistor ("JFET"), a bipolar junction transistor ("BJT"), silicon-controlled rectifiers ("SCR"), an insulated-gate bipolar transistor ("IGBT") or the like.

In some embodiments, the second rectification device includes a charging diode (e.g. D6 or D7) that has a cathode connected to the intermediate node 406. Where the rectification section 304 is a full-bridge rectifier or has multiple legs with diodes, the second rectification device 404 includes two or more charging diodes D6, D7; one for each leg in the rectification section 304. Where the rectification section 304 is a half-bridge rectifier, the second rectification device 404 may include a single charging diode (e.g. D6). As with the first rectification device 402, the charging diode(s) D6, D7 within the second rectification device 404 may be replaced by a device that includes a diode-type function that conducts when current flows from the rectification section 304 to the capacitor C7 and blocks current from the capacitor C7 to the rectification section 304. The charging diodes D6, D7 may be replaced by a switch, such as the semiconductor switches described above.

Where the rectification section 304 is a full-bridge rectifier, as depicted in FIG. 4B, the full-bridge rectifier includes two series-connected diodes D1, D2 in a first leg connected between the positive bus 410 and a return 412 and a second leg includes two series-connected diodes D3, D4 connected between the positive bus 410 and return 412 as shown. The diodes of the first leg D1, D2 and the diodes D3, D4 of the second leg are connected in series and the cathode of each diode D1-D4 is oriented toward the positive bus 410 and where the secondary pad 128 provides power to a point between each pair of diodes D1, D2 and D3, D4 in the first leg and in the second leg. An anode of a first charging diode D6 of the second rectification device 404 is connected between the diodes D1, D2 of the first leg and an anode of a second charging diode D7 of the rectification device is connected between the diodes D3, D4 of the second leg.

Figure 5:
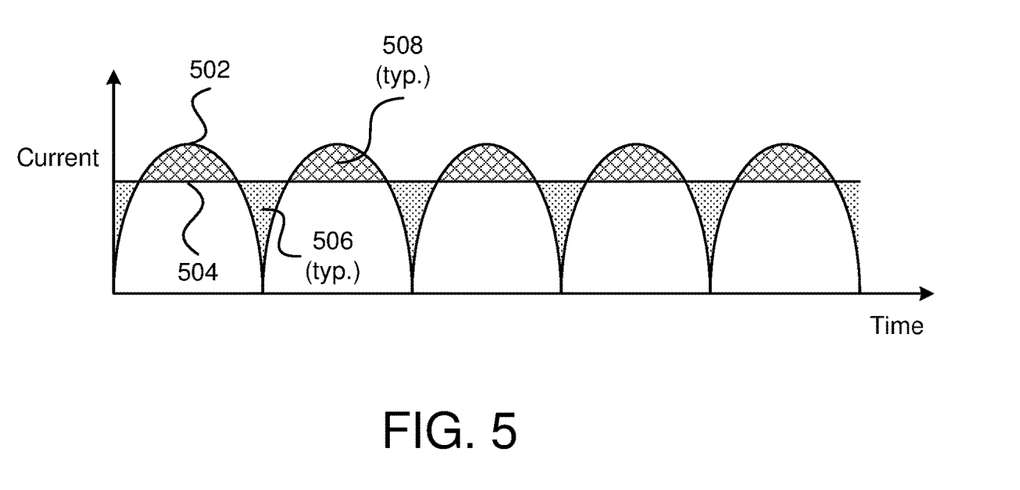
FIG. 5 is a graphical illustration of a rectification section current and a load current.

FIG. 5 is a graphical illustration 500 of a rectification section current 502 and a load current 504. The rectification current 502 of the illustration is the rectification section current I$_{rect}$ of FIGS. 3A and 3B and the load current 504 is the load current I$_{load}$ of FIGS. 3A and 3B. The load current 504 is depicted as a straight line, but one of skill in the art will recognize that the load current 504 typically includes some ripple. Typically, the capacitor C7 provides a low pass filter function to smooth the ripple so that the load current 504 does not have the same profile as the rectification section current 502.

As the rectification section current 502 rises, without the first rectification device 402 and the second rectification device 404 current will flow into the capacitor C7. Voltage of the capacitor C7 changes slowly so that as voltage of the positive bus 410 rises above voltage of the capacitor C7, the capacitor will sink current. Energy stored in the capacitor C7 will support current to the load 110 when voltage of the positive bus 410 is lower than voltage on the capacitor C7.

With the first rectification device 402 and the second rectification device 404 included, as depicted in FIGS. 4A and 4B, the first rectification device 402 will block current from the positive bus 410 from flowing into the capacitor C7, but when voltage at the nodes between the diodes of the rectification section 304 rise above the voltage of the capacitor C7, current will flow through the second rectification device 404 to the capacitor C7, which is represented by the area 508 above the load current 504 and below the rectification section current 502. When the rectification section current 502 is below the load current 504, which corresponds to when voltage at the nodes between the diodes of the rectification section 304 is below the voltage of the capacitor C7, current will not flow through the second rectification device 404, but current will flow from the capacitor C7 through the first rectification device 402 to the load 110. The area 506 below the load current 504 and above the rectification section current 502 represents current flowing through the first rectification device 402.

Power loss in the first rectification device 402 and the second rectification device 404 may be less than power loss through a diode in series with the load 110. In addition, pre-charging of the capacitor C7 may be accomplished through the second rectification device 404 while inrush current from the load 110 is blocked by the first rectification device 402. Energy from the secondary pad 128 and rectification section 304 can be configured as a current source, which limits current to the capacitor C7 to prevent high inrush current.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a wireless power receiver ("WPR") pad configured to receive power wirelessly; and
   a secondary circuit comprising:
   a rectification section that receives power from the WPR pad, an output of the rectification section comprising a positive bus and a negative bus;
   a capacitor;
   a first rectification device connected between the positive bus and a first connection of the capacitor at an intermediate node, and a second connection of the capacitor connected to the negative bus, wherein a load is connected between the positive bus and the negative bus; and
   a second rectification device connected to the rectification section and the intermediate node between the capacitor and first rectification device,
   wherein the rectification section is configured to rectify alternating current received from the WPR pad and configured to provide rectified current to the load.

2. The apparatus of claim 1, wherein the first rectification device is a low impedance for current from the capacitor to the load and a high impedance for current from the load to the capacitor.

3. The apparatus of claim 2, wherein the first rectification device comprises a blocking diode, an anode of the blocking diode is connected to the capacitor, and a cathode of the blocking diode is connected to a positive bus that connects the rectification section to the load.

4. The apparatus of claim 1, wherein the load comprises a battery.

5. The apparatus of claim 1, wherein the second rectification device is a high impedance for current from the capacitor to the rectification section and a low impedance for current from the rectification section to the capacitor.

6. The apparatus of claim 1, wherein the second rectification device comprises a charging diode, the charging diode comprising a cathode connected to the intermediate node.

7. The apparatus of claim 6, wherein the rectification section comprises a full bridge rectifier comprising two series-connected diodes in a first leg connected between the positive bus and the negative bus and a second leg comprising two series-connected diodes connected between the positive bus and the negative bus, wherein an anode of a first charging diode of the second rectification device is connected between the diodes of the first leg and an anode of a second charging diode of the second rectification device is connected between the diodes of the second leg, and wherein a cathode of the first and second charging diodes is connected to the intermediate node.

8. The apparatus of claim 7, wherein the diodes of the first leg and the diodes of the second leg are connected in series with the cathode of each diode oriented toward the positive bus, and wherein the WPR pad provides power to a point between each pair of diodes in the first leg and in the second leg.

9. The apparatus of claim 1, wherein the secondary circuit further comprises a tuning section comprising one or more of an inductor and a capacitor, the tuning section connected between the WPR pad and the rectification section.

10. The apparatus of claim 1, wherein the WPR pad comprises a ferrite structure comprising a planar surface and a winding wound adjacent to the planar surface, wherein the winding is in a spiral-type configuration.

11. The apparatus of claim 10, wherein the WPR pad comprises one or more capacitors in series with one or more windings of the WPR pad.

12. The apparatus of claim 1, wherein the WPR pad is a secondary WPR pad that receives power from a primary wireless power transfer ("WPT") pad positioned with a gap between the primary WPT pad and the secondary WPR pad, and power is transferred wirelessly across the gap.

13. The apparatus of claim 12, wherein the primary WPT pad and secondary WPR pad transfer power with an alternating current ("AC") waveform that is rectified by the rectification section.

14. An apparatus comprising:
a wireless power receiver ("WPR") pad configured to receive power wirelessly;
a secondary circuit comprising:
a rectification section that receives power from the WPR pad, an output of the rectification section comprising a positive bus and a negative bus;
a capacitor;
a first rectification device connected between the positive bus and a first connection of the capacitor at an intermediate node, and a second connection of the capacitor connected to the negative bus, wherein a load is connected between the positive bus and the negative bus, and wherein the first rectification device comprises a blocking diode and wherein the load comprises a battery; and
a second rectification device connected to the rectification section and the intermediate node between the capacitor and first rectification device, wherein the second rectification device comprises a first charging diode and a second charging diode,
wherein the rectification section comprises a full-bridge rectifier comprising two series-connected diodes in a first leg connected between the positive bus and the negative bus and a second leg comprising two series-connected diodes connected between the positive bus and the negative bus, wherein an anode of the first charging diode of the second rectification device is connected between the diodes of the first leg and an anode of the second charging diode of the second rectification device is connected between the diodes of the second leg.

15. The apparatus of claim 14, wherein an anode of the blocking diode is connected to the capacitor at the intermediate node and a cathode of the blocking diode is connected to the positive bus, and wherein the first and second charging diodes each comprise a cathode connected to the intermediate node.

16. The apparatus of claim 14, wherein the diodes of the first leg and the diodes of the second leg are connected in series with the cathode of each diode oriented toward the positive bus, and wherein the WPR pad provides power to a point between each pair of diodes in the first leg and in the second leg.

17. The apparatus of claim 14, wherein the secondary circuit further comprises a tuning section comprising one or more of an inductor and a capacitor, the tuning section connected between the WPR pad and the rectification section.

18. The apparatus of claim 14, wherein the WPR pad comprises a ferrite structure comprising a planar surface and a winding wound adjacent to the planar surface, wherein the winding is in a spiral-type configuration.

19. The apparatus of claim 18, wherein the WPR pad comprises one or more capacitors in series with one or more windings of the WPR pad and wherein the WPR pad is a secondary WPR pad that receives power from a primary wireless power transfer ("WPT") pad positioned with a gap between the primary WPT pad and secondary WPR pad, and power is transferred wirelessly across the gap.

20. A system comprising:
a power converter apparatus connected to a power source;
a secondary receiver apparatus mounted to a vehicle, the secondary receiver apparatus configured to receive power wirelessly from the power converter apparatus comprising a primary wireless power transfer ("WPT") pad, the secondary receiver apparatus comprising:
a secondary wireless receiver ("WPR") pad; and
a secondary circuit comprising:
a rectification section that receives power from the secondary WPR pad, an of output the rectification section comprising a positive bus and a negative bus;
a capacitor;
a first rectification device connected between the positive bus and a first connection of the capacitor at an intermediate node, and a second connection of the capacitor connected to the negative bus, wherein a load of a vehicle is connected between the positive bus and the negative bus; and
a second rectification device connected to the rectification section and the intermediate node between the capacitor and first rectification device,
wherein the rectification section is configured to rectify alternating current received from the WPR pad and configured to provide rectified current to the load.

* * * * *